R. A. NICHOLL.
TRACTOR.
APPLICATION FILED OCT. 12, 1918.

1,299,600.

Patented Apr. 8, 1919.

Inventor
Robert A. Nicholl.
By Pagelsen and Spencer,
Attorney

UNITED STATES PATENT OFFICE.

ROBERT A. NICHOLL, OF DETROIT, MICHIGAN.

TRACTOR.

1,299,600.  Specification of Letters Patent.  Patented Apr. 8, 1919.

Application filed October 12, 1918. Serial No. 257,873.

*To all whom it may concern:*

Be it known that I, ROBERT A. NICHOLL, a citizen of the United States, and residing at Detroit, in the county of Wayne and State of Michigan, have invented a new and Improved Tractor, of which the following is a specification.

This invention relates to motor driven vehicles of the tractor type, and its object is to provide a simple and powerful tractor wheel which shall be mounted centrally of the vehicle.

This invention consists in a wide tractor wheel mounted on an axle between the side bars of the frame or chassis of a motor driven vehicle, the tractor wheel having a central circumferential groove, and a tractor chain extending around this tractor wheel in the groove therein and around a chain wheel connected to the motor of the vehicle.

Figure 1:
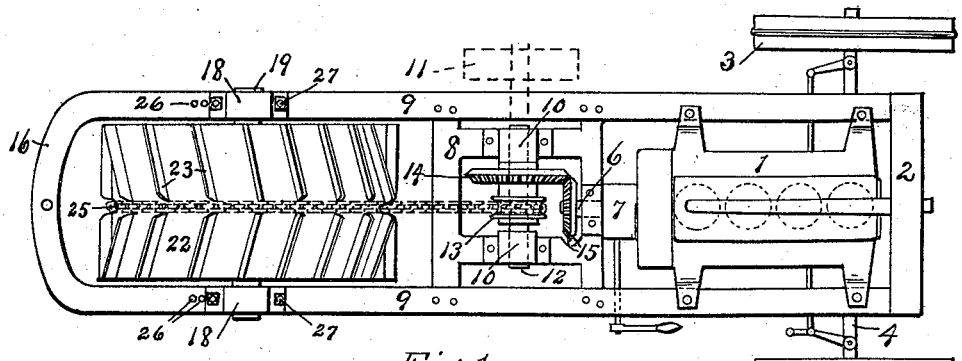
Figure 2:
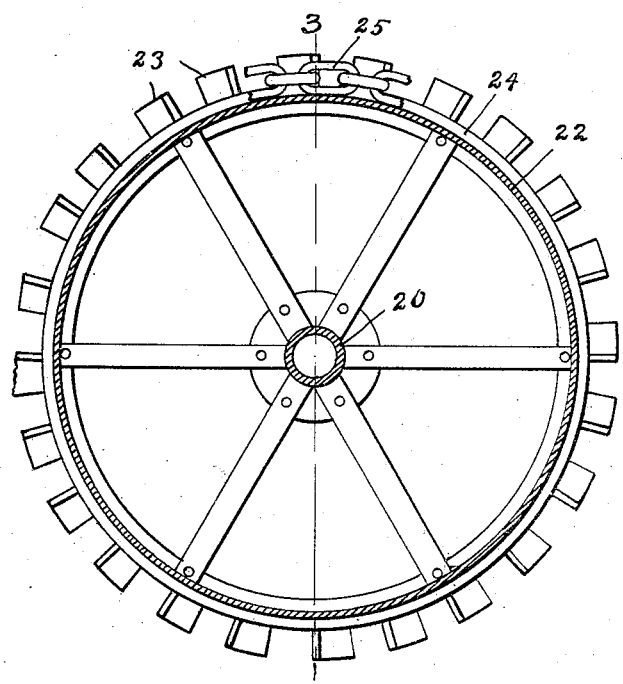
Figure 3:
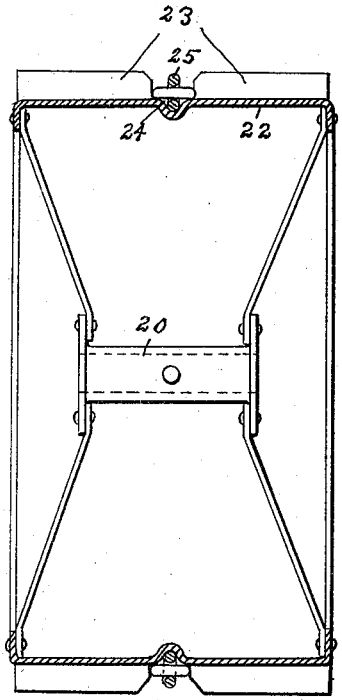

In the accompanying drawing, Figure 1 is a plan of a tractor. Fig. 2 is a central transverse section of the tractor wheel. Fig. 3 is a section of the tractor wheel on the line 3—3 of Fig. 2.

Similar reference characters refer to like parts throughout the several views.

The various details of construction of this tractor may all be changed without departing from the spirit of my invention set forth in the annexed claims. The engine 1, radiator 2, steering wheels 3 and front axle 4 may be of any desired types and are indicated conventionally. Any usual transmission gears may be provided between the engine and the longitudinal shaft 6, a casing for such gears being indicated at 7, but no gears are shown as they form no part of the present invention.

A transverse frame 8 is mounted on the side bars 9 of the chassis and supports bearings 10 for the shaft 12 which has secured to it a chain wheel 13 and a bevel gear 14 that meshes with the gear 15 on the shaft 6. The shaft 12 may be extended if desired and a pulley 11 may be mounted thereon as indicated in dotted lines in Fig. 1. The side bars 9 are preferably of channel bars and connected by the rounded end 16 which renders this frame sufficiently rigid.

Bearings 18 on these side bars support a rear axle 19 on which is mounted the hub 20 of the tractor wheel. The outer face 22 of this wheel may be provided with cleats 23 and it has a groove 24 in which is positioned the tractor chain 25 which also passes around the chain wheel 13. This chain is preferably made of heavy metal and the groove may be of any desired depth but is preferably only sufficient to receive the metal of one side of the links.

The wheel may rotate on the axle or the axle may turn in the bearings. Additional holes 26 for the bolts 27 provide for shifting the bearings to tighten the chain. When the tractor is traveling over heavy clay ground, the cakes of soil which adhere to the wheel and bridge the chain will be broken away by the chain as it leaves the wheel. Because of the central mounting of the wheel, the drive is always central to the tractor and wrenching of the frame is largely avoided. The centrally mounted wheel has fully as much contact area as the driving wheels of the usual four-wheel tractors, and being centrally mounted, this wheel will always exert full traction centrally of the vehicle and thus obviate the tendency of the vehicle to swing which occurs when one of two rear traction wheels engages firmer soil than the other. The extreme simplicity of this traction mechanism makes for great strength and permits of low manufacturing cost.

The tractor wheel may be secured to the axle 19 and the axle turn in its bearings, but I prefer to secure the axle in the bearings 18 and have the wheel rotate on the axle. In the latter case heavy lubricant can be forced in between the hub 20 and the axle and work its way outwardly, escaping at the ends of the hub and forcing out with it any dust which may have entered the ends of the space between hub and axle.

I claim:—

1. In a tractor, the combination of a chassis comprising a pair of side bars, an axle mounted thereon, a tractor wheel mounted on the axle and having a central circumferential groove, an endless chain passing around the wheel in said groove, and means to drive the chain, said groove being of less depth than the diameter of the chain so that the chain will extend outward beyond the diameter of the wheel.

2. In a tractor, the combination of a chassis comprising a pair of side bars, an axle mounted thereon, a tractor wheel mounted on the axle and having a smooth circumferential groove, an endless tractor chain of greater diameter than the depth of the groove passing around said wheel in said groove, means to drive the chain, and cleats on the face of said wheel on each side of said groove.

3. In a tractor, the combination of a chassis comprising a pair of side bars, an axle mounted thereon, a tractor wheel mounted on the axle, an endless chain passing around the wheel, said wheel being formed to receive a portion only of the links of said chain, the major portion of the chain lying on the outside of the general circumference of the wheel so as to extend beyond the diameter of the wheel, and means to drive said chain.

ROBERT A. NICHOLL.

Copies of this patent may be obtained for five cents each, by addressing the "Commissioner of Patents, Washington, D. C."